ced by patent examiner's markings: "106. COMPOSITIONS, COATING OR PLASTIC 85", "Cross Reference Examiner", "2,295,637 38"]

UNITED STATES PATENT OFFICE 2,295,637

HIGHLY REFRACTORY MASS

Karl Dietz, Kronberg, Taunus, Germany; vested in the Alien Property Custodian

No Drawing. Application February 6, 1941, Serial No. 377,667. In Germany February 1, 1940

11 Claims. (Cl. 106—104)

The present invention relates to highly refractory masses.

In French Patent No. 853,675, there are described highly refractory cement powders which, when made up with aqueous alumina sol, yield mortars, tamping material and materials for repairs and coating which harden even with exclusion of air and are characterized in that they contain calcined and then finely ground residue obtained by the alkaline extraction of chromium from its ores.

Now, I have found that instead of the calcined residue of the alkaline extraction of chromium ores there may be used for the preparation of self-hardening highly refractory mortars calcined, cooled and then ground magnesium oxides or other substances containing magnesium oxide. For instance sintered magnesium oxide and alumina sol or steatite material, i. e., sintered magnesium silicates or hydrosilicates which also may contain low amounts of iron and other metal oxides and alumina sol, yield the same effects, especially when the prescriptions in the above cited French patent as to the fineness of grinding and the composition of the different sizes of grains are observed.

The mortars, tamping material and materials for repairs and coating thus prepared are distinguished by an especially good thermal conductivity, stability to variation of temperature and a high stability against attacks by slags. Since the masses are capable of self-hardening they may be used for the manufacture of various kinds of moulded bodies.

The above cement powders are self-hardening, highly refractory binding agents and when used in practice may be mixed with other refractory substances, such as grogs, as well as with fluxing materials of various kinds.

The following example serves to illustrate the invention, but it is not intended to limit it thereto:

Sintered magnesium oxide is ground after cooling. The ground product is sieved. From the sieved grain fractions a cement powder of the following composition is made:

| | Per cent |
|---|---|
| The ground product passed through a sieve of 500 meshes per square centimeter but retained by a sieve of 3600 meshes per square centimeter | 90 |
| The ground product passed through a sieve of 10,000 meshes per square centimeter | 10 |

100 grams of the cement powder thus obtained are mixed with 35 cc. of alumina sol of specific gravity 1.45. The mass sets after a short time and after three days it shows an average strength of 40 kilos per square centimeter. Test pieces from the mass are not attacked by water, neither in the cold nor at the boiling point. The hardened masses show a refractoriness of more than Seger cone 38 and soften (ta-point) under a pressure of 2 kilos per square centimeter at 1400° C. The "ta-point" is that temperature at which a cylindrical test piece under load ceases to expand as its temeprature rises but is shortened by a jolt due to the softening of the piece.

The sintered magnesium oxide may be replaced by calcined steatite material which is treated and of which grain fractions are selected and composed in the same way.

The coarse fractions of the pulverized mortar may be exchanged for fire-proof grogs. There may also be admixed fluxing materials and other substances.

I claim:

1. A method of producing highly refractory hydraulic mortars, tamping material, materials for repairs and coating and shaped bodies therefrom which comprises mixing cement powders obtainable by calcining, then cooling and finely grinding compounds of magnesia, selected from the group consisting of magnesium oxide and magnesium silicates with alumina sol.

2. A method of producing highly refractory hydraulic mortars, tamping material, materials for repairs and coating and shaped bodies therefrom which comprises mixing cement powders obtainable by calcining, then cooling and finely grinding compounds of magnesia, selected from the group consisting of magnesium oxide and magnesium silicates with alumina sol and other finely ground refractory materials.

3. A method of producing highly refractory hydraulic mortars, tamping material, materials for repairs and coating and shaped bodies therefrom which comprises mixing cement powders obtainable by calcining, then cooling and finely grinding compounds of magnesia, selected from the group consisting of magnesium oxide and magnesium silicates with alumina sol and fluxes.

4. A method of producing highly refractory hydraulic mortars, tamping material, materials for repairs and coating and shaped bodies therefrom which comprises mixing cement powders obtainable by calcining, then cooling and finely grinding compounds of magnesia, selected from the group consisting of magnesium oxide and magnesium silicates with alumina sol, other finely ground refractory materials and fluxes.

5. Hardened masses and bodies prepared according to claim 1, said masses and bodies being highly refractory.

6. Hardened masses and bodies prepared according to claim 2, said masses and bodies being highly refractory.

7. Hardened masses and bodies prepared according to claim 3, said masses and bodies being highly refractory.

8. Hardened masses and bodies prepared according to claim 4, said masses and bodies being highly refractory.

9. A method of producing highly refractory hydraulic mortars, tamping material, materials for repairs, and coating and shaped bodies therefrom, which comprises mixing cement powders with alumina sol, said cement powders being obtained by calcining, cooling and finely grinding compounds of magnesia selected from the group consisting of magnesium oxide and magnesium silicates, the grinding being effected so that about 90 per cent of the ground product passes through a sieve of 500 meshes per square centimeter but is retained by a sieve of 3600 meshes per square centimeter and 10 per cent of the ground product passes through a sieve of 10,000 meshes per square centimeter.

10. Hardened masses and bodies prepared according to claim 9, said masses and bodies being highly refractory.

11. The process as defined in claim 1 wherein about 2 parts by weight of the cement powders are mixed with about 1 part by weight of the alumina sol.

KARL DIETZ.